March 6, 1962  J. STATSINGER  3,023,617
NAVIGATION APPARATUS
Filed June 1, 1953  3 Sheets-Sheet 1

INVENTOR.
JOSEPH STATSINGER
BY
Raymond A. Paquin
ATTORNEY.

March 6, 1962  J. STATSINGER  3,023,617
NAVIGATION APPARATUS
Filed June 1, 1953  3 Sheets-Sheet 2

INVENTOR.
JOSEPH STATSINGER
BY Raymond A. Paquin
ATTORNEY.

INVENTOR.
JOSEPH STATSINGER

_United States Patent Office_

3,023,617
Patented Mar. 6, 1962

3,023,617
NAVIGATION APPARATUS
Joseph Statsinger, New York, N.Y., assignor to
American Bosch Arma Corporation
Filed June 1, 1953, Ser. No. 358,753
7 Claims. (Cl. 73—178)

The present invention relates to navigational apparatus and has particular reference to instruments which continuously indicate instantaneous position.

The apparatus of this invention by reference only to the earth's gravity vector and using only initial settings of initial position continuously determines the present position of a moving craft. In addition, the time rates of change position are utilized to determine the ground speed and true course of the craft.

The present invention is an inertial navigational system using accelerometers and positioning gyroscopes, in which the sensitive axes of the accelerometers are maintained irrotational with respect to inertial space about an axis perpendicular to the sensitive axes but are allowed to rotate in azimuth with respect to earth. By this means an instrument inherently free of the common Coriolis and centrifugal acceleration errors is produced. Prior instruments based on inertial navigation systems have been proposed but as far as can be determined, they do not maintain the axes of the accelerometers irrotational with respect to inertial space in the manner of the present invention. The term "inertial space" is used in place of the longer term "inertial space reference" and implies a reference system of axes fixed with respect to the stars within which the earth rotates about its own polar axis. Any motion of a craft on earth which is referred to the inertial space reference must have the motion of the earth with respect to the inertial space added to it. Concisely, if the motion of the craft in space is known, the motion of the craft with respect to earth can be determined by subtracting therefrom the motion of the earth with respect to inertial space.

The present invention also makes use of the concept of the "earth's radius" pendulum which is, according to theory, unaffected by accelerations of the pendulum pivot.

The function of the earth-radius pendulum, that of maintaining a vertical reference or horizontal plane, is fulfilled by a gyroscopic system having an undamped period of an "earths-radius" pendulum, i.e.

$$T = 2\pi \sqrt{\frac{l}{g}}$$

where $l$ is the length of the "earths-radius" and includes the height of the instrument above the earth's surface. At the earth's surface $T=84.4$ minutes, approximately. Two accelerometers are mounted on the vertical or horizontal reference medium to measure the horizontal linear accelerations of the craft in directions 90° apart. The outputs of the accelerometers are integrated to provide signals indicative of the linear velocity of the craft in each of two mutually perpendicular directions. The linear velocity indications are scaled to produce signals proportional to angular velocity about the center of the earth. These signals are then used to maintain the horizontal or vertical reference, and also as the inputs to an instrument for calculating the latitude and longitude.

In the preferred embodiment here described one horizontal spin axis gyro is coerced to maintain its axis perpendicular to the axis of another horizontal spin axis gyro which is free to move in azimuth. The follow up member is positioned according to the two gyros, and carries two accelerometers each of which measures the horizontal acceleration in a direction parallel to the spin axis of one of the gyros. The output of each accelerometer is coupled to the corresponding gyroscope through an integrator, a suitable scaling device and a torque device so that a deviation of the gyro axis from the horizontal results in a torque on the gyro of proper magnitude and time phase so as to cause the motion of the gyro to be an undamped oscillation about the horizontal with a period of T minutes.

This instrumentation results in a physical arrangement such that the sensitive axes of the two accelerometers are aligned along orthogonal horizontal axes and are maintained irrotational about an axis perpendicular to the sensitive axes with respect to inertial space, while apparently rotating about this axis with respect to earth.

The integrated accelerometer outputs, which represent velocities in the direction of the sensitive axes of the accelerometers, are resolved in a position computer using information concerning the rate of rotatation of the accelerometer axes with respect to earth into components of velocity which are irrotational with respect to a frame of reference on earth. The coordinates of present position are determined by integration and inputs of initial position. Also, the speed, course and heading of the craft are calculated by suitably combining the positional and velocity information. Although in the embodiment to be described the most common position coordinates of latitude and longitude are employed, any configuration of coordinates may be used with suitable changes in the position computer.

For a better understanding of the invention, reference may be had to the accompanying diagrams in which:

FIGURE 5 shows an alternative gyroscopic system which may be used in place of that in FIGURE 1;

The operation of the present instrument will be more readily understood after a study of the theory on which the instrument is based. In the discussion of the theory which follows, it is assumed that the earth is a perfect sphere, and that the craft carrying the instrument is moving over the surface of the earth.

Figure 1:
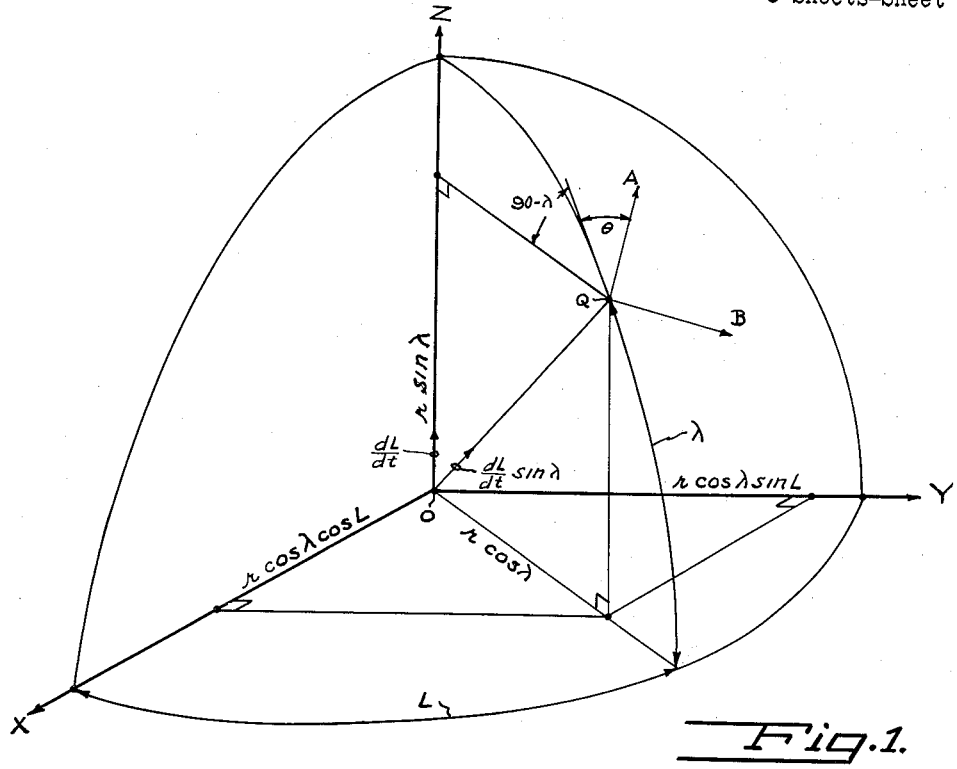
FIGURE 1 is a diagram illustrating the configuration of axes involved in the theoretical analysis of the operation of the instrument.

With reference now to FIGURE 1, the position Q of the craft can be determined with respect to three mutually perpendicular axes X, Y, and Z which are fixed in space and which are chosen to have their origin at the center of the earth with the Z axis passing through the poles of the earth and with the equatorial plane of the earth in the XY plane. The craft can also be located by spherical coordinates of $r$, L and $\lambda$ where $r$ is the distance of the craft from the center of the earth and is equal to the radius of the earth plus the height of the craft above the surface of the earth, L is the absolute longitude of the position and $\lambda$ is the geocentric latitude. For the purposes of discussion $r$ will be assumed to be a constant. The term "absolute longitude" is used to denote that the longitude is measured from a plane fixed in space and is the sum of a longitude measurement with respect to earth plus the angular rotation of the earth with respect to the inertial or fixed plane. The term "geocentric latitude" is used to denote that the latitude of the position of the craft is measured from the vertical defined by the gravity vector, rather than with respect to a "plumb line" vertical at the surface of the earth. Although the maximum error between geocentric and "plumb line" latitudes is not greater than six minutes of arc it is important to recognize its existence and to compensate for its effect as will be described. A pendulum at a position other than the poles of the earth or at the equator will swing away from the line joining its support and the center of the earth as a result of the centrifugal force due to the rotation of the earth, and will not indicate the true direction of the gravity vector. It should be noted that the terms horizontal and vertical as used in the theoretical discussions of the instrument indicate the attitude with respect to the gravity vector rather than the plumb-bob vector.

The relationships between the coordinates in the cartesian and spherical systems are as follows:

$$x = r \cos L \cos \lambda$$
$$y = r \sin L \cos \lambda \quad (1)$$
$$z = r \sin \lambda$$

The motion of the craft at Q with respect to the X, Y, Z axes is described by the three velocity components determined by differentiation of equations (1) with respect to time. Thus:

$$V_x = \frac{dx}{dt} = -r\frac{dL}{dt} \sin L \cos \lambda - r\frac{d\lambda}{dt} \cos L \sin \lambda$$

$$V_y = \frac{dy}{dt} = r\frac{dL}{dt} \cos L \cos \lambda - r\frac{d\lambda}{dt} \sin L \sin \lambda \quad (2)$$

$$V_z = \frac{dz}{dt} = r\frac{d\lambda}{dt} \cos \lambda$$

Acceleration (other than gravity) acting on Q is described by three components along the X, Y, Z axes which may be found by differentiation of Equations 2 with respect to time. Thus:

$$\alpha_x = \frac{d^2x}{dt^2} = -r\frac{d^2L}{dt^2} \sin L \cos \lambda$$
$$- r\left(\frac{dL}{dt}\right)^2 \cos L \cos \lambda - r\frac{d^2\lambda}{dt^2} \cos L \sin \lambda$$
$$- r\left(\frac{d\lambda}{dt}\right)^2 \cos L \cos \lambda + 2r\frac{dL}{dt}\frac{d\lambda}{dt} \sin L \sin \lambda$$

$$\alpha_y = \frac{d^2y}{dt^2} = r\frac{d^2L}{dt^2} \cos L \cos \lambda$$
$$- r\left(\frac{dL}{dt}\right)^2 \sin L \cos \lambda - r\frac{d^2\lambda}{dt^2} \sin L \sin \lambda$$
$$- r\left(\frac{d\lambda}{dt}\right)^2 \sin L \cos \lambda - 2r\frac{dL}{dt}\frac{d\lambda}{dt} \cos L \sin \lambda$$

$$\alpha_z = \frac{d^2z}{dt^2} = r\frac{d^2\lambda}{dt^2} \cos \lambda - r\left(\frac{d\lambda}{dt}\right)^2 \sin \lambda \quad (3)$$

At point Q on the earth a system of orthogonal axes having axes QA and QB in the horizontal plane, and QO coinciding with a radius of the earth, may be constructed. The displacement of the QA axis from the meridian through Q may be any angle, $\theta$.

The velocity components $V_A$ and $V_B$ of Q along the QA and QB axes respectively are determined by resolving the velocity components $V_x$, $V_y$ and $V_z$ on the QA and QB axes. Thus:

$$V_A = (V_z \cos \lambda - V_x \cos L \sin \lambda - V_y \sin L \sin \lambda) \cos \theta$$
$$- (V_x \sin L - V_y \cos L) \sin \theta \quad (4)$$

$$V_B = (V_z \cos \lambda - V_x \cos L \sin \lambda - V_y \sin L \sin \lambda) \sin \theta$$
$$+ (V_x \sin L - V_y \cos L) \cos \theta \quad (5)$$

Substitution of Equations 2 in 4 and 5 leads to the following expressions:

$$V_A = r\left[\frac{dL}{dt} \cos \lambda \sin \theta + \frac{d\lambda}{dt} \cos \theta\right] \quad (6)$$

$$V_B = r\left[\frac{dL}{dt} \cos \lambda \cos \theta - \frac{d\lambda}{dt} \sin \theta\right]$$

$V_A$ and $V_B$ are linear velocities in the direction of the QA and QB axes respectively. In order to maintain the plane of the QA and QB axes horizontal it will be seen that the plane must be rotated about the QB axis at an angular rate of $$W_A = \frac{V_A}{r} = \frac{dL}{dt} \cos \lambda \sin \theta + \frac{d\lambda}{dt} \cos \theta \quad (6a)$$

and about the QA axis at an angular rate of $$W_B = \frac{V_B}{r} = \frac{dL}{dt} \cos \lambda \cos \theta - \frac{d\lambda}{dt} \sin \theta \quad (6b)$$

The acceleration components $\alpha_A$ and $\alpha_B$ of Q along the QA and QB axes respectively are determined by resolving the acceleration components $\alpha_x$, $\alpha_y$, and $\alpha_z$ into the QA and QB axes using the relationships similar to those of Equations 4 and 5. Thus, it is found that:

$$\alpha_A = r\left\{\left[\frac{d^2L}{dt^2} \cos \lambda - 2\frac{dL}{dt}\frac{d\lambda}{dt} \sin \lambda\right] \sin \theta \right.$$
$$\left. + \left[\frac{d^2\lambda}{dt^2} + \left(\frac{dL}{dt}\right)^2 \sin \lambda \cos \lambda\right] \cos \theta\right\}$$

$$\alpha_B = r\left\{\left[\frac{d^2L}{dt^2} \cos \lambda - 2\frac{dL}{dt}\frac{d\lambda}{dt} \sin \lambda\right] \cos \theta \right.$$
$$\left. - \left[\frac{d^2\lambda}{dt^2} + \left(\frac{dL}{dt}\right)^2 \sin \lambda \cos \lambda\right] \sin \theta\right\} \quad (7)$$

In the navigation system of this invention, these accelerations are measured by the accelerometers which are mounted to sense accelerations in the QA and QB directions. The outputs of the accelerometers are integrated, the integrator output is divided by $r$ and the resulting signal is used to apply proportional torques to the gyros whose spin axes correspond to the QA and QB axes. If the precessional rate of the gyro whose axis is collinear with the QA axis due to the applied torque is $P_A$ and the precessional rate of the gyro whose spin axis is collinear with the QB axis due to the applied torque is $P_B$, then the following equations may be written:

$$P_A = \frac{1}{r}\int^n \alpha_A dt$$
$$P_B = \frac{1}{r}\int \alpha_B dt \quad (8)$$

where $\alpha_A$ and $\alpha_B$ are given by Equations 7.

The gyro spin axes will remain horizontal only if the precessional rates of Equation 8 are respectively equal to the rotational rates of the plane of the QA and QB axes about the QB and QA axes, or if $$P_A = W_A$$
and
$$P_B = W_B \quad (9)$$

where $W_A$ and $W_B$ are equal to the expressions of Equations 6a and 6b. It will be seen that if the conditions of Equation 9 are satisfied, there can be no Coriolis or centrifugal errors since the precession rates of the gyros are exactly correct without extraneous corrections. Equation 9 will be fulfilled when the axes QA and QB are allowed to rotate about OQ at their natural rate. This can be demonstrated in the following manner:

The natural rate of rotation of the QA and QB axes about the OQ axis is the component about OQ of the rotation of Q about OZ. Since the rotation about OZ is $dL/dt$, which includes both rotation of the earth and east-west travel of the craft Q, the component about OQ is $$\frac{dL}{dt} \sin \lambda$$

which is the natural time rate of change of $\theta$. Thus the equation:

$$\frac{d\theta}{dt} = \frac{dL}{dt} \sin \lambda \qquad (10)$$

may be written.

Differentiating Equation 8 with respect to time and substituting from Equation 7 it is found that $$\frac{dP_A}{dt} = \frac{\alpha_A}{r} = \left[\frac{d^2L}{dt^2} \cos \lambda - 2\frac{dL}{dt}\frac{d\lambda}{dt} \sin \lambda\right] \sin \theta$$
$$+ \left[\frac{d^2\lambda}{dt^2} + \left(\frac{dL}{dt}\right)^2 \sin \lambda \cos \lambda\right] \cos \theta \qquad (11)$$

Differentiating Equation 6a with respect to time, it is found that $$\frac{dW_A}{dt} = \frac{d^2L}{dt^2} \cos \lambda \sin \theta - \frac{dL}{dt}\frac{d\lambda}{dt} \sin \lambda \sin \theta$$
$$+ \frac{dL}{dt}\frac{d\theta}{dt} \cos \lambda \cos \theta + \frac{d^2\lambda}{dt^2} \cos \theta - \frac{d\lambda}{dt}\frac{d\theta}{dt} \sin \theta$$

or $$\frac{dW_A}{dt} = \left[\frac{d^2L}{dt^2} \cos \lambda - \frac{dL}{dt}\frac{d\lambda}{dt} \sin \lambda - \frac{d\lambda}{dt}\frac{d\theta}{dt}\right] \sin \theta$$
$$+ \left[\frac{dL}{dt}\frac{d\theta}{dt} \cos \lambda + \frac{d^2\lambda}{dt^2}\right] \cos \theta \qquad (12)$$

It will be seen that substituting the value of $d\theta/dt$ found in Equation 10 for the value of $d\theta/dt$ in Equation 11 and 12 will make the right hand expressions of Equations 11 and 12 equal, so that $$\frac{dP_A}{dt} = \frac{dW_A}{dt} \qquad (13)$$

Since the derivatives are equal, $P_A = W_A$ except possibly for a constant of integration which reflects the initial conditions and which can be accounted for in the initial setting of the instrument. By similar reasoning it can be shown that $P_B = W_B$.

The accelerometers of the preferred embodiment of this invention produce voltages proportional to $\alpha_A$ and $\alpha_B$ which are integrated and divided by $r$ to produce voltages proportional to $W_A$ and $W_B$ as demonstrated above. Solving for $$\frac{dL}{dt} \cos \lambda \text{ and } \frac{d\lambda}{dt}$$

from Equations 6a and 6b it is found that $$\frac{dL}{dt} \cos \lambda = W_A \cos \theta + W_B \sin \theta$$

$$\frac{d\lambda}{dt} = W_A \sin \theta - W_B \cos \theta \qquad (14)$$

The computer associated with this instrument solves the Equations 10, 14 simultaneously to produce instantaneous values of $L$, $\lambda$ and $\theta$. With these, and the values of $$\frac{dL}{dt} \text{ and } \frac{d\lambda}{dt}$$

the speed of the craft, its course and heading are also instrumented.

It is seen that the axis OQ rotates about the earth's polar axis, and this rotation results in a rotation of OQ in inertial space about its own longitudinal axis at a rate equal to $$\frac{dL}{dt} \sin \lambda$$

Also the axes QA and QB rotate at a rate $$\frac{d\theta}{dt}$$

which is equal to $$\frac{dL}{dt} \sin \lambda$$

about the OQ axis. Thus, the rotation of the QA and QB axes about the OQ axis is the same as the rotation of the OQ axis in space so that the QA and QB axes may be described as being irrotational with respect to inertial space about the OQ axis.

Figure 2:
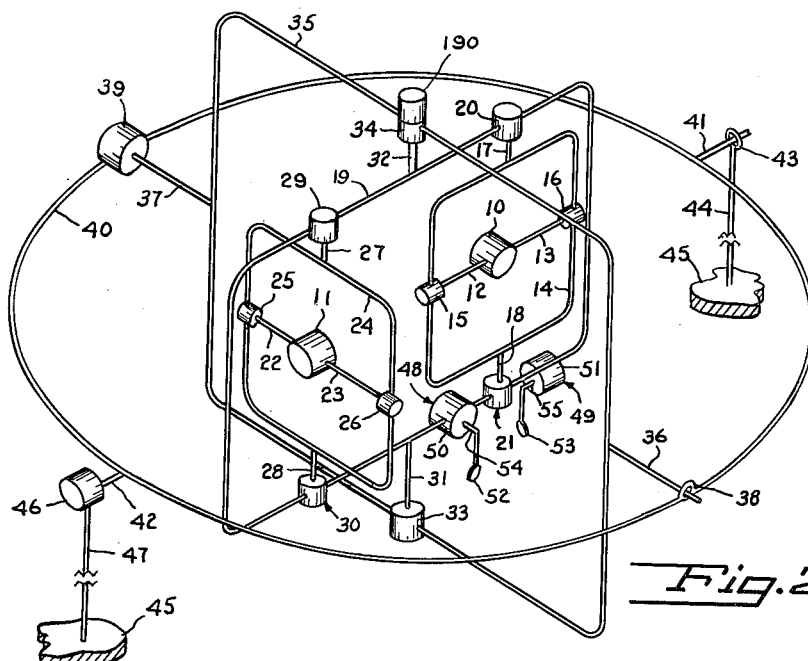
FIGURE 2 is a pictorial representation of the mechanical structure of one part of the invention.

With reference now to FIGURE 2 of the drawings, numerals 10, 11 designate the casings within which horizontal spin axis gyroscope wheels, not shown, are rotated preferably by electrical means.

Gyro casing 10 is supported by the horizontal shafts 12, 13 which are rotatable within the gimbal ring 14. The construction shown in FIG. 2, wherein the shafts 12, 13 are connected directly to the rotors of the torque motor 15 and pickoff device 16 respectively, is merely schematic. It should be understood that the shafts 12, 13 are preferably journalled in bearings (not shown) which are carried by the gimbal ring 14, the shafts 12, 13 are connected to the rotors of the torque motor 15 and pickoff device 16 the stators of which are carried by the gimbal ring 14. The simplified schematic representation is used throughout FIGURE 2, although it should be understood that actual practice may employ the construction described above, or other similar construction.

Gimbal ring 14 is supported by vertical shafts 17, 18 which are rotatable within the yaw frame 19 by connection of shafts 17, 18 to the rotors of torque motor 20 and pick-off device 21 respectively, the stators of which are carried by frame 19.

Gyroscope 11 is similarly suspended in the yaw frame 19. Thus, the gyroscope 11 is supported by horizontal shafts 22, 23, which are rotatable in the gimbal ring 24 by connection of the shafts 22, 23 to the rotors of torque motor 25 and pickoff device 26 respectively. The shafts 7 and 28 of gimbal ring 24 are connected to the rotors of torque motor 29 and pickoff device 30 respectively, the stators of which are carried by the yaw frame 19, so that the gimbal frame 14 is supported in and rotatable with respect to gimbal frame 19.

The vertical shafts 31, 32 of yaw frame 19 are terminated in the rotors of follow up motor 33 and resolver 34, the stators of which are carried by the pitch gimbal frame 35. The horizontal shafts 36, 37 of pitch gimbal 35 are journalled in bearing 38 and in the bearings of motor 39 respectively. The bearing 38 and the stator of motor 39 are carried by roll gimbal ring 40 which is supported by shafts 41 and 42. Shaft 41 is journalled in bearing 43 held in support 44 which is secured to the unstable deck 45 of the craft, and shaft 42 is journalled in the bearings of motor 46, the stator of which is carried by support 47, also secured to the deck 45.

Thus, the yaw frame is mounted for rotation about three axes, through shafts 31, 32, shafts 36, 37 and shafts 41, 42. Yaw frame 19 also carries the two accelerometers 48, 49 which are adapted to respond to the accelerations of the craft in directions parallel and perpendicular to the plane of the yaw gimbal, which as it will be seen later, are accelerations in the directions of the spin axis of the gyroscopes 10 and 11. The accelerometers shown in FIGURE 2 constitute pendulum controlled pickoff devices 50, 51 whose stators are carried by the yaw gimbal 19 while the pendulums 52 and 53 are suspended from the rotor shafts 54, 55 respectively of the pickoff devices 50 and 51. It should be noted that the pendulum-pickoff combinations are merely one type of accelerometer and any other suitable type may be used if desired. In the matter to follow, the term "proportional to" as applied to a voltage will be understood to describe a voltage whose amplitude is proportional to the magnitude of a quantity, while the phase of the voltage is changed by 180° upon reversal of sign of the quantity.

Figure 3:
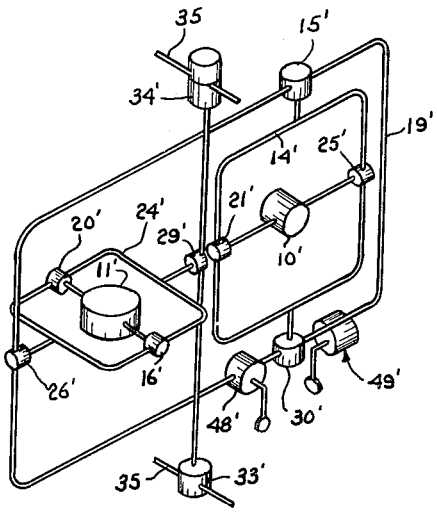
FIGURE 3 is a schematic electrical wiring diagram of the invention.

With reference now to FIGURE 3, the stator windings 56 and 57 of the pickoff devices 30 and 21 respectively are connected to one phase of a constant alternating voltage supply, designated by the symbol $\phi_1$. The rotor windings 58 and 59, driven respectively by the shafts 28 and 18, have voltages induced in them which are proportional to the displacements of the shafts 28 and 18 from the zero positions. Thus, the voltage induced in rotor winding 58 is proportional to the angular displacement of frame 24 from the position perpendicular to the plane of frame 19 while the voltage induced in rotor winding 59 of pickoff device 21 is proportional to the angular displacement of the frame 14 from frame 19.

The output of rotor winding 58 energizes the control field winding 60 of motor 33, after amplification in amplifier 61. The main field winding 62 of motor 33 is energized by the other phase of the constant alternating voltage supply which is designated by the symbol $\phi_2$ and which is quadrature with the voltage of $\phi_1$. Thus, while the gyro 11 keeps the frame 24 oriented in one direction, the motor 33 is energized to drive shaft 31 and frame 19 until the stator of pickoff device 30 is in the position where the output of rotor winding 58 is zero, whence the frame 24 is perpendicular to the yaw frame 19 and motor 33 is deenergized.

The foregoing operation results in displacement of the stator winding 57 of pickoff device 21 from the rotor winding 59, which is oriented by gyro 10, inducing a corresponding voltage in said rotor winding. The output voltage of rotor winding 59 is applied to control field winding 64 of torque motor 15 after amplification in the amplifier 63. The main field winding of the motor 15 is energized by $\phi_2$ so that motor 15 develops a torque which is applied to the gyro 10 about the axis through shafts 12, 13. The torque thus applied causes precession of the gyro 10 in azimuth in a direction which reduces the displacement between the frames 14 and 19. When the displacement of rotor winding 59 from stator winding 57 is zero, the torque motor 15 is deenergized and the planes of the gimbal frames 14 and 19 coincide. Under these conditions, the spin axes of gyros 10 and 11 are perpendicular to each other.

Yaw frame 19 is stabilized in the roll and pitch gimbals 40 and 35 by the motors 39 and 46 in a manner corresponding to the platform stabilization by a stable element as described in more detail in copending application Serial No. 738,242, filed March 29, 1947. Any rotation of frame 19 about a horizontal axis may be resolved into component rotations about the axes 12—13 and 22—23. Rotation of the frame 19 about the axis 12—13 with respect to the stable reference of gyro 10 results in production of a proportional voltage in the pickoff device 16. Also rotation of the frame 19 about the axis 22—23 with respect to the stable reference of gyro 11 results in production of a proportional voltage in the pickoff device 26. The outputs of pickoff devices 16 and 26 energize the stator windings of resolver 34, the rotor windings 34a and 34b of which are driven by shaft 32.

The output of rotor winding 34a energizes follow up motor 39, while the output of rotor winding 34b energizes follow up motor 46. The resolver 34 acts as a coordinate transformer whereby the deviations of frame 19 from the gyros 10 and 11 about the perpendicular axes 12—13 and 22—23 are transformed into deviation of the frame 19 from the horizontal about the perpendicular axes defined by the shafts 36, 37 and 41, 42 when lying in the horizontal plane.

Motors 39 and 46 therefore drive the gimbal rings 35 and 40 respectively until the position of gimbal frame 19 corresponds to the position of the gyros 10 and 11, i.e. until the outputs of the pickoff devices 16 and 26 are zero and motors 39 and 46 are deenergized. In this manner the gimbal frame 19 is stabilized.

Pendulum 52 is mechanically adapted to displace the rotor winding 65 of pickoff device 50 relatively to the stator winding 66 upon accelerations of the support in the plane of gimbal frame 19, and upon tilts of shafts 31 and 32 out of the vertical in the plane of the gimbal frame 19. The stator winding 66 of the pickoff device 50 is energized by $\phi_1$ to induce in the rotor winding 65 a voltage proportional to that component $\alpha_A$, of the horizontal acceleration acting on accelerometer 48 i.e. that which is in the plane of gimbal frame 19 when frame 19 is vertical. The rotor winding 65 is connected to energize the control field winding 67 of motor 68, jointly with and in opposition to the output of output winding 69 of linear induction generator 70 through the high-gain amplifier 71. The main field winding 72 of motor 68 is energized by $\phi_2$ while the main field winding 70 of generator 70 is energized by $\phi_1$.

The motor 68 drives the shaft 73 and the rotor of generator 70' at a speed such that the voltage of output winding 69 very nearly equals that of rotor winding 65, since any great difference would be amplified by the amplifier 71 so as to cause the motor 68 to change the speed of the generator to thereby reduce the difference, whence the speed of shaft 73 is proportional to the voltage of rotor winding 65. Thus, the displacement of shaft 73 is proportional to the time integral of the voltage of rotor winding 65 or is proportional to $K\int \alpha_A dt$ which is proportional to the horizontal velocity $V_A$ in the plane of the yaw gimbal 19. The motor generator 68, 70 arrangement comprises a well known integrating device I, whose action will be understood without further description here.

Switches 160 and 188 are interposed in the connections between integrator I and rotor winding 65 for a purpose to be described later. As shown in FIGURE 3 the movable contacts of switch 160 are urged to the right and the corresponding right hand stationary contacts are electrically connected together.

The shaft 73 displaces the movable contact 74 of resistance potentiometer 75, proportionally to $V_A$, so that the output voltage of potentiometer 75, taken between contact 74 and center tap 76 on resistor 77 is proportional to $V_A$. If the value $V_A$ represents a linear velocity at a distance $a+h$ from the center of the earth where $a$ is the mean radius of the earth and $h$ is the altitude of the craft, then the rotational velocity of the craft about the center of the earth is $$\frac{V_A}{a+h} \text{ or } \frac{V_A}{r}$$

where $r$ is equal to $(a+h)$.

Since the range of $h$ is small with respect to $a$, the instrumentation of $$\frac{V_A}{a+h}$$

can be accomplished with sufficient accuracy by subtraction of a quantity variable with $h$ from the constant value $$\frac{V_A}{a}$$

Thus, $$\frac{V_A}{a+h}$$

can be written as $$\frac{V_A}{a\left(1+\frac{h}{a}\right)}$$

and expansion of $$\frac{1}{\left(1+\frac{h}{a}\right)}$$

gives the series $$1 - \frac{h}{a} + \frac{H^2}{a^2} - \frac{h^3}{a^3} \ldots$$

whence $$\frac{V_A}{a+h} = \frac{V_A}{a}\left(1 - \frac{h}{a} + \frac{h^2}{a^2} \cdots \right)$$

It is well known that the difference between the sum of an alternating series and a partial sum of the first $n$ terms is less than the $(n+1)$ term. Therefore, if everything after $$1 - \frac{h}{a}$$

is neglected the error introduced thereby will be less than $$\left(\frac{h}{a}\right)^2$$

Since the ratio of $h/a$ is not expected to exceed 0.2 percent, the error introduced will be less than .04 percent when the expression $$\frac{V_A}{a}\left(1 - \frac{h}{a}\right)$$

is used in place of $$\frac{V_A}{a+h}$$

To perform this calculation voltage divider 78 comprising a fixed resistor 79 and a potentiometer 80 is energized by the voltage output of the potentiometer 75. The output voltage of the voltage divider 78, taken across the movable contact 81 of the potentiometer 80 and the fixed resistor 79, is equal to the difference between the output of potentiometer 75 and the voltage between the movable contact 81 of the potentiometer 80 and that end of the resistance winding 82 which is connected directly to the output of potentiometer 75. The movable contact 81 is driven according to $h/a$ by shaft 83 by manual means, for example as by knob and dial 83', or by automatic means (not shown) responsive to an altimeter reading. The dial 83' may be calibrated in values of $h$ rather than $h/a$.

Since the voltage energizing the voltage divider 78 is proportional to $$\frac{V_A}{a}$$

($a$ is a constant), and the movable contact 81 is displaced according to $h/a$, the voltage divider output is proportional to $$\frac{V_A}{a} - \frac{V_A h}{a^2}$$

which is substantially equal to $$\frac{V_A}{a+h} \text{ or } \frac{V_A}{r}$$

The output of voltage divider 78 is connected to the right hand stationary contacts 84a of switch 84 the movable contacts 84c of which are urged to the right in FIG. 2 by the switch bar 85. The bar 85 is manually actuated to the right by the handle 86 whenever the craft is in motion, and actuated to the left whenever the craft is stationary, for reasons to be explained.

The movable contacts 84c are connected to the input of amplifier 87, the output of which activates the motor 29 by energizing the control field winding 88, the main field winding 89 being constantly energized by $\phi_2$. Motor 29 therefore applies a torque to the gyro 11 about a vertical axis causing precession of the spin axis about the horizontal axis through shafts 22, 23. The spin axis of the gyro 11 therefore is precessed in the plane of the gimbal frame 19 at a rate which may be made equal to the rate of the rotation of the gyro support about the center of the earth by proper choice of the components in the circuit just described. It will be seen that if the spin axis of gyro 11 is initially horizontal, it will remain horizontal for any acceleration of the craft.

The accelerometer 49 is connected to the torque motor 20 through a similar circuit. Thus, accelerometer 49 which is sensitive to acceleration of the gyro support in directions perpendicular to the plane of gimbal frame 19 is shown as a pendulum actuated pickoff 51 wherein the rotor winding 90 is connected mechanically to the pendulum 53 so that the voltage induced in rotor winding 90 is proportional to the horizontal acceleration $\alpha_B$, and to the tilt of the shafts 31, 32 from the vertical in a plane perpendicular to the plane of frame 19. Assuming that shafts 31, 32 are vertical, the output of rotor winding 90 is proportional to $\alpha_B$. The $\alpha_B$ voltage is integrated in the integrator II, which for variety is illustrated as a well known mechanical integrator. The voltage from rotor winding 90 is matched against the output of potentiometer 91 and the difference voltage is used to energize the motor 92 which adjusts the potentiometer 91 to thereby deenergize itself. The displacement of the shaft 93 of motor 92 therefore corresponds to $\alpha_B$. Shaft 93 displaces the wheel 94 along a radius of the continuously rotating disc 95, driven by motor 96, so that the speed of drum 97, driven by wheel 94, is proportional to $\alpha_B$ and the displacement of drum 97 is proportional to $\int \alpha_B dt$. Drum 97 drives shaft 98 which is connected to adjust the movable contact of potentiometer 99. The output voltage of potentiometer 99 is proportional to $\int \alpha_B dt$ or $V_B$, the horizontal linear velocity of the craft in a direction perpendicular to the plane of the gimbal frame 19. The output of potentiometer 99 is modified by voltage divider 100 which is similar to voltage divider 78. The movable contact of the potentiometer 101 of voltage divider 100 is driven by shaft 83 so that the voltage output of voltage divider 100 is proportional to $$\frac{V_B}{r}$$

the angular velocity of the craft about the center of the earth in a direction perpendicular to the plane of the frame 19.

One output terminal of voltage divider 100 is connected to the right hand stationary contact 102a of switch 102, the movable contact 102c of which is actuated by the bar 85. The movable contact 102c is connected to one input terminal of amplifier 105 the other terminal of which is connected to the remaining terminal of voltage divider 100. The control field winding 108 of torque motor 20 is connected to the output of amplifier 105 while the main field winding 109 of the motor is energized by $\phi_2$. The voltage output of voltage divider 100 therefore energizes the control field winding 108, so that motor 20 applies a torque to gyro 10 about a vertical axis causing precession of the spin axis of gyro 10 about the horizontal axis through shafts 12, 13 at a rate proportional to the angular velocity of the craft about the center of the earth in the direction perpendicular to the plane of gimbal frame 19. It will be seen that by proper choice of the circuit components the rate of precession of gyro 10 can be made equal to the angular velocity. Thus, if the spin axis is initially horizontal it will always remain horizontal. The portion of the instrument just described comprises the "earth's-radius" pendulum.

Since the spin axes of the gyros 10 and 11 are initially oriented in the horizontal and are made to remain horizontal as the craft moves by the device just described, the outputs of pickoffs 48 and 49 are proportional to the accelerations $\alpha_A$ and $\alpha_B$ respectively and there is no component of voltage due to the tilt of frame 19 from the vertical.

The voltages $$\frac{V_A}{r} \text{ and } \frac{V_B}{r}$$

from voltage dividers 78 and 100 which are proportional to the angular velocities $W_A$ and $W_B$ of the craft about the center of the earth, are used to determine the latitude and longitude of the position of the craft accurately and continuously by simultaneous solution of the Equations 10 and 14 in the manner to be described.

The voltage output of voltage divider 78, proportional to $W_A$ energizes the primary winding 110 of electromechanical resolver 111, while the voltage output of voltage divider 100, proportional to $W_B$ energizes the primary winding 112 of the resolver 111. The secondary or rotor windings 113 and 114 of resolver 111 are displaced by the output shaft 115 of an integrating device III which may be of the type illustrated by integrators I and II. Assuming that the displacement of shaft 115 is an arbitrary value, U, then the voltage outputs $E_1$ and $E_2$ of rotor windings 113 and 114 are respectively:

$$E_1 = W_A \sin U + W_B \cos U$$
and
$$E_2 = W_A \cos U - W_B \sin U \quad (15)$$

Comparison of Equations 15 with Equation 14 shows that when $U = \theta$ $$E_1 = \frac{dL}{dt} \cos \lambda \quad (16)$$

and $$E_2 = \frac{d\lambda}{dt} \quad (17)$$

Assuming for the present that shaft 115 is positioned according to $\theta$, the output voltage of rotor winding 114 is proportional to $$\frac{d\lambda}{dt}$$

The voltage output of rotor winding 114 is applied to the terminals 116 of an integrator IV which may be similar to the integrators previously described. The change in displacement of the output shaft 117 of the integrator IV is therefore proportional to the integral of $$\frac{d\lambda}{dt} \text{ or } \Delta\lambda$$

the change in latitude of the position of the craft. If shaft 117 is initially set at a position corresponding to $\lambda_0$, the initial latitude, then the displacement of shaft 117 at any time is proportional to $\lambda_0 + \Delta\lambda = \lambda$, which may be read on dial 118 opposite the stationary index 119.

The $$\frac{dL}{dt} \cos \lambda$$

voltage output of rotor winding 113 is applied to the stator or primary winding 120 of resolver 121, the rotor or secondary windings 122, 123 of which are displaced according to $\lambda$ by the shaft 117 as described above. The other stator winding 124 of resolver 121 is energized by the output of potentiometer 125, taken between the movable contact 126 and the center tap 127 on resistance winding 128 which is designated as $E_3$, the resistance winding 128 being energized by the constant voltage of $\phi_1$.

The voltage induced in rotor winding 122 energizes the control field winding 129 of motor 130 after transmission through amplifier 131, while the main field winding 132 of motor 130 is energized by $\phi_2$. Motor 130 therefore drives shaft 133 to thereby adjust the movable contact 126 of potentiometer 125 until the voltage induced in rotor winding 122 is zero and motor 130 is deenergized. Since the voltage energizing stator winding 120 is $$\frac{dL}{dt} \cos \lambda$$

and the displacement of rotor winding 122 is proportional to $\lambda$, the voltage $E_4$ induced in rotor winding 122 when the excitation voltage of stator winding 124 is $E_3$ is:

$$E_4 = E_3 \cos \lambda - \frac{dL}{dt} \cos \lambda \sin \lambda \quad (18)$$

At the solution position where $E_4 = 0$, $E_3 \cos \lambda$ is equal to $$\frac{dL}{dt} \cos \lambda \sin \lambda$$

whence $E_3$ must be proportional to $$\frac{dL}{dt} \sin \lambda$$

or to $d\theta/dt$ in accordance with Equation 10.

The $d\theta/dt$ voltage output of potentiometer 125 is applied to the movable contacts of switch 161, the right hand stationary contacts 161a of which are connected to the terminals 134 of integrator III so that when the movable contacts of switch 161 are urged to the right, the integrator III acts to produce a change in displacement of shaft 115 proportional to $$\int \frac{d\theta}{dt} \text{ or } \Delta\theta$$

If the initial position of shaft 115 is properly aligned to $\theta_0$ (the initial value of $\theta$) then the position of shaft 115 always corresponds to $\theta_0 + \Delta\theta$ or $\theta$. Thus, the input quantities $W_A$ and $W_B$ to resolver 111 are continuously resolved into $$\frac{dL}{dt} \cos \lambda$$

and $$\frac{d\lambda}{dt}$$

which are in turn used to continuously compute $$\frac{dL}{dt} \sin \lambda$$

and $\theta$ as described. In this manner, the assumption previously made, that shaft 115 is displaced according to $\theta$, is substantiated.

The voltage $E_5$ induced in rotor winding 123 of resolver 121 for the conditions which prevail for Equation 18 is $$E_5 = E_3 \sin \lambda + \frac{dL}{dt} \cos^2 \lambda \quad (19)$$

Since $$E_3 = \frac{dL}{dt} \sin \lambda, E_5 = \frac{dL}{dt} \sin^2 \lambda + \frac{dL}{dt} \cos^2 \lambda = \frac{dL}{dt}$$

The $dL/dt$ voltage output of rotor winding 123 is applied, jointly with the output of voltage divider 136 to the input terminals 135 of an integrator V which may be similar to the integrators described earlier.

It will be recalled that the longitude L is the absolute longitude which is the sum of the displacement with respect to earth plus the displacement in space resulting from the rotation of the earth. Maps and charts are prepared according to terrestial longitude, so that for use of the present invention in navigational instruments the displacement of shaft 137, the output shaft of integrator V, should indicate the terrestial longitude.

To this end the voltage output of potentiometer 136 is chosen to be proportional to the rate of rotation of the earth, $W_E$, so that the voltage applied to integrator V, which is the difference between the outputs of rotor winding 123 and potentiometer 136, is proportional to $$\frac{dL}{dt} - W_E$$

or is proportional to $dL'/dt$, the rate of change of terrestial longitude. The output shaft 137 of integrator V is therefore displaced according to $$\int \frac{dL'}{dt} \text{ or } \Delta L'$$

the change in terrestial longitude of the craft. If shaft 137 is initially set to $L'_0$, the terrestial longitude of the initial position, the displacement of shaft 137 at any time corresponds to $L'_0 + \Delta L'$ or $L'$, the present terrestrial longitude of the craft. The value of $L'$ may be read on the dial 137'.

Means other than the voltage divider 136 may be employed to modify the $\Delta L$ output of integrator V when the terminals 135 are connected directly to winding 23. For example, the longitude dial may be driven by a mechanical differential whose inputs are $\Delta L$ from the integrator V, and $W_E T$ from a synchronous motor so that the change in dial displacement is $\Delta L - W_E T$ or $L'$.

Figure 4:
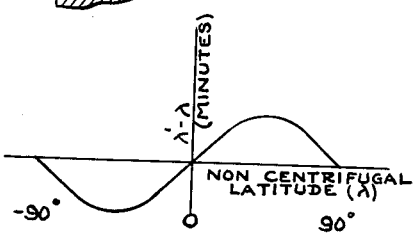
FIGURE 4 illustrates the difference between the geocentric and astronomical latitudes.

It has been shown that shaft 117 is positioned according to $\lambda$, where $\lambda$ is the geocentric latitude. Maps and charts, however, are prepared by sighting stars and using a reference vertical determined by a plumb line, so that the latitude shown on charts is the "plumb line" or astronomical latitude which is represented by $\lambda'$. The difference between the astronomical latitude and the geocentric latitude is a result of the centrifugal force on the pendulum due to rotation of the earth and varies from 0 at the poles and the equator to a maximum of about six minutes at $\pm 45°$ latitude as shown in FIG. 4.

In order to indicate the astronomical latitude $\lambda'$, for use in navigation, the dial 118 is provided with a movable index 140. The movable index 140 is driven by the gearing 141 on shaft 142 which is the output shaft of cam 143. The input shaft 144 of cam 143 is displaced according to $\lambda$ by shaft 117 and the cam 143 is constructed so that the output shaft 142 is displaced according to the curve shown in FIG. 4, i.e. according to the difference between the geocentric latitude and the astronomical latitude. The figure on dial 118 opposite the index 140 is therefore proportional to the astronomical latitude.

The previously described operation has been based on the assumption that the spin axes of the gyros 10 and 11 are horizontal at the time when apparatus becomes operative.

This is accomplished when the craft is stationary, preparatory to the beginning of the trip, by actuating the switch bar 85 to the left, in FIG. 3, into the "alignment position."

The conditions which are to be attained during the alignment operation are those which give the conditions assumed previously, and which are as follows:

(a) $\theta$ is zero; axis "A" aligned with the meridian (shaft 115 at zero)

(b) $\lambda$ is set to $\lambda_0$ (shaft 117 at $\lambda_0$)

(c) L is set to $L_0$ (shaft 137 at $L_0$)

(d) $\dfrac{W_A}{r} = 0$ (shaft 73 at zero)

(e) $\dfrac{W_B}{r} = W_E \cos \lambda_0$ (integrator II output $= W_E \cos \lambda_0$)

(f) Spin axes of gyros 10 and 11 are horizontal.

It will be seen how these initial conditions are set into the instrument. Shaft 117 is set manually to $\lambda_0$ the latitude of the initial position by reading $\lambda_0$ on dial 118, thereby positioning the movable contact 163 of potentiometer 164 according to $2\lambda_0$ along the resistance 165, which is shaped in a manner such that the output of potentiometer 164, taken between movable contact 163 and center tap 166 on resistance 165, is proportional to $k \sin 2\lambda_0$, where $k$ is a constant. The output of the potentiometer 164 is applied to the left hand stationary contacts 160b of switch 160 so that the voltage $k \sin 2\lambda_0$ is connected in series with the output of pendulum pickoff device 50 when the instrument is in the alignment condition and bar 85 is positioned to the left in FIG. 3. This combined signal voltage is also connected in series with the output of potentiometer 125 by means of the switch 161 and the total voltage is applied to amplifier 150 through switch 151. Switch 162 short circuits the input of integrator III so that the output shaft 115 does not wander from the zero position to which it is manually positioned. It will be shown later that the output of potentiometer 125 is proportional to $W_E \sin \lambda_0$ so that the voltage applied to amplifier 150 is proportional to:

$$k \sin 2\lambda_0 + W_E \sin \lambda_0 + E_{50}$$

where $E_{50}$ is the output of pickoff device 50, and is proportional to the displacement, $\delta$, of pendulum 52 from the frame 19.

The output of amplifier 150 is applied to the control field winding 152 of torque motor 25, the main field winding 153 of which is energized by $\phi_2$. The torque motor 25 therefore applies a torque to gyro 11 about the axis of shafts 22, 23 which is proportional to $k \sin 2\lambda_0 + W_E \sin \lambda_0 + \delta$. Also the voltage $k \sin 2\lambda_0 + E_{50}$ is applied to the amplifier 87 by means of switch 84 so that the motor 29 is energized accordingly and applies a torque to gyro 11 about the axis 27—28 proportional to $k \sin 2\lambda_0 + \delta$.

It will be seen that the gyro 11 acts as a gyro compass and settles on the meridian with its spin axis inclined to the pendulum 52 by an amount proportional to $k \sin 2\lambda_0$ and precessing in azimuth at a rate proportional to $W_E \sin \lambda_0$. The centrifugal force due to earth's rotation displaces pendulum 52 from the vertical, so that to keep the spin axis of the gyro 11 horizontal it must be displaced from the pendulum reference by an amount proportional to the error angle, i.e. proportionally to $\sin 2\lambda_0$. The torque applied by motor 29 becomes zero when the voltage energizing said motor is zero, or when $$\delta = -k \sin 2\lambda_0$$

whence the spin axis of the gyro is horizontal. At this time the voltage applied to motor 25 is proportional to $W_E \sin \lambda_0$ (since $\delta + k \sin 2\lambda_0 = 0$) and the spin axis of gyro 11 precesses at a rate proportional to $W_E \sin \lambda_0$ so that the axis is always on the meridian, thereby correcting for the vertical component of earth's rotation.

The spin axis of gyro 10 settles in the east-west plane in accordance with the action previously described where the axes of gyros 10 and 11 are made perpendicular to each other. However, when the axis is in the east west position, the easterly end will rise with the rotation of the earth so that a correcting torque must be applied to the gyro 10 about the vertical axis proportional to the horizontal component of earth's rotation, $W_E \cos \lambda_0$. To this end rotor winding 90 of pickoff device 50 is connected across the stationary terminals of switch 102 so that when switch 102 is urged to the left, the voltage applied to amplifier 105 is the sum of the outputs of rotor winding 90 and voltage divider 100. The output of amplifier 105 energizes torque motor 20 as before. This circuit will operate in the following manner to adjust the output of voltage divider 100 to be proportional to $W_E \cos \lambda_0$. For any voltage other than $W_E \cos \lambda_0$ the spin axis of the gyro 10 will tilt thereby causing a tilt of frame 19 which produces an output voltage in pickoff device 51 to effect a precession of the gyro 10 spin axis to the horizontal. The instantaneous outputs of pickoff 51 are integrated over a period of time in the integrator II, until the voltage output of the voltage divider 100 is proportional to $W_E \cos \lambda_0$. The torque applied to the gyro 10 by motor 20 is then proportional to $W_E \cos \lambda_0$ so that the spin axis of gyro 10 remains horizontal, and output of pickoff 51 is zero. It should be noted that the voltage output of voltage divider 100, $W_E \cos \lambda_0$ is the angular velocity component about the A axis when the craft is stationary so that the initial condition that $$\frac{W_B}{r} = W_E \cos \lambda_0$$

is satisfied.

The output of voltage divider 78, $W_A / r$ may be manually set to zero and the input of integrator I shortcircuited, or the circuit of FIG. 2 may be used to effect automatic setting of the integrator I to zero. When the instrument is put into the alignment condition switch 188 disconnects the integrator I from the pendulum pickoff 50 and applies the output of voltage divider 78 to the input of the integrator I. Motor 68 therefore acts to drive the movable contact 74 of potentiometer 75 in a direction tending to reduce the input to integrator I, i.e. toward the center tap 76, thereby deenergizing motor 68 when the shaft 73 is adjusted to the zero position.

Stator winding 112 of resolver 111 is energized by the $W_E \cos \lambda_0$ signal, the voltage applied to stator winding 110 is zero, and the rotor of resolver 111 is manually set to zero so that the output of rotor winding 113 is proportional to $W_E \cos \lambda_0$. As previously described, the output of rotor winding 113 is applied to stator winding 120 of resolver 121, while the $E_6$ output of potentiometer 125 is applied to the rotor of resolver 121. The rotor of resolver 121 is now manually positioned according to $\lambda_0$, so that motor 130, which drives the movable contact 126 of potentiometer 125 in tending to deenergize itself, adjusts the output of potentiometer 125 to $W_E \sin \lambda_0$ whereby the output of winding 122, proportional to $W_E \sin \lambda_0 \cos \lambda_0 - W_E \cos \lambda_0 \sin \lambda_0$, is equal to zero. Thus, the condition that the output of potentiometer 125 is proportional to $W_E \sin \lambda_0$ which was earlier assumed to be true has been established.

After the gyros 10 and 11 have settled so that their axes are horizontal and directed toward east and north respectively, the instrument is in a steady state standby condition. The output of rotor winding 123 of resolver 121 is proportional to $W_E$, and the voltage applied to the input of integrator V is therefore $W_E - W_E$, or zero. At this time the shaft 137 may be manually positioned to the known longitude, L′, of the initial craft position.

It has been shown that with the switch bar 85 positioned to the left in FIG. 3 the initial conditions which must prevail before the instrument is put into operation are obtained and maintained until the craft carrying the apparatus is set into motion. When the craft begins to move from its starting position, the switch bar 18 is positioned to the right in FIG. 3 and the navigation instrument described earlier is made operative.

An alternative arrangement of the gyroscopically controlled horizontal platform for maintaining the accelerometers in position and orienting the sensitive axes of the accelerometers in azimuth according to the rotation of the axis of measurement of $V_A$ and $V_B$ is shown in FIG. 5.

In this figure only the new arrangement of the inner structure is shown, the follow-up system of FIG. 2 being understood to support the gimbal frame 19′ of FIG. 5 as indicated by the portions of gimbal frame 35 which carry the resolver 34′ and the follow up motor 33′. Elements performing duties similar to those in FIGURE 2 are identified by similar characters using the primes to distinguish those elements used in FIG. 5.

Thus, the gimbal frame 19′ is maintained vertical by vertical spin axis gyro 11′, to which the follow up motors 39 and 46 are made responsive by means of the pickoff devices 16′ and 26′ and resolver 34′. The accelerometers 48′ and 49′ carried by the frame 19 are connected through an integrating circuit such as that of FIGURE 3 to the torque motors 20′ and 29′ which apply torques to the gyro 11 about perpendicular horizontal axes to maintain the spin axis vertical for all accelerations of the craft.

The gyro 10′ is slaved to the vertical spin axis gyro 11 to maintain the spin axis of gyro 10′ horizontal. Thus, the displacement of gyro 10′ from the horizontal is sensed by pickoff device 21′ which applies a voltage to torque motor 15′ to cause precession of the gyro spin axis towards the horizontal. The gyro 10′ is free to move in azimuth, however, and by means of pickoff device 30′ energizes the follow up motor 33′ to drive the gimbal frame 19′ in azimuth and thereby orients the accelerometers 48′ and 49′ so that they are responsive to accelerations in the directions of measurement $V_A$ and $V_B$.

The alignment procedure for this construction is comparable to that of FIGS. 2 and 3. In this instance the "azimuth-free" gyro is gyro 10′ and the spin axis of gyro 10′ is preferably initially aligned with the meridian rather than east-west. This is accomplished by connecting the output of pickup device 21′ to the torque motor 25′ as well as to torque motor 15′. The latitude correction voltage $W_E \sin \lambda_0$ is also applied to torque motor 25′ and is derived as described in connection with FIG. 3. The gyro 10′ therefore acts as a compass, since the frame 19′ is kept vertical by the gyro 11′ and the deviation of the spin axis 10′ from the frame 19 is detected by pickup device 21′. The apparent rise of the easterly end of the spin axis of gyro 10′ causes motor 25′ to be energized to apply a torque to gyro 10′ resulting in precession of the spin axis towards the meridian. The torque motor 15′ supplies the damping torque required by the compass.

The torque motors 20′ and 29′ of the gyro 11′ are energized by the pendulum pickup devices 48′ and 49′ respectively so as to cause erection of the spin axis of gyro 11′ into the true vertical. The centrifugal correction, $k \sin 2\lambda_0$, is applied by torque motor 20′ while the correction for horizontal component of earth's rotation $W_E \cos \lambda_0$ is applied by torque motor 29. These corrections are derived in a manner similar to that shown in FIG. 3.

Figure 6:
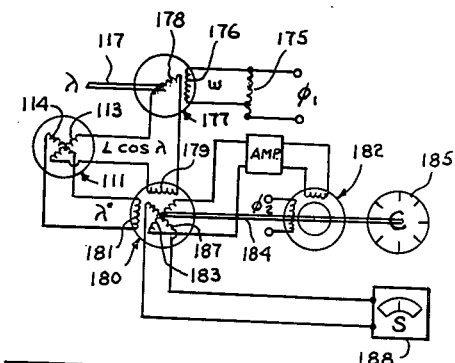
FIGURE 6 is a wiring diagram of the computer by which speed and course are determined.
Figure 3:
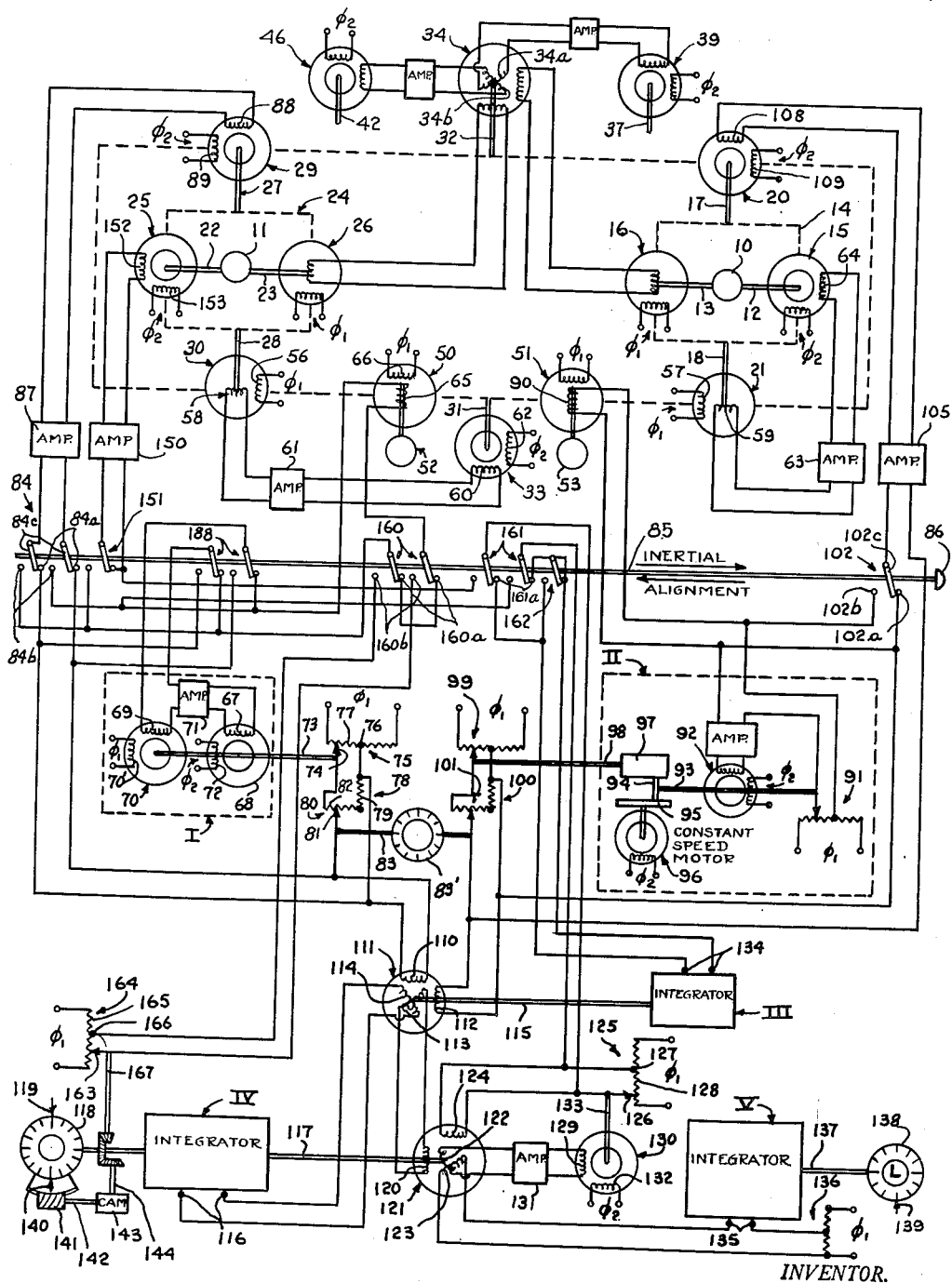

The instrument of this invention can be easily adapted to indicate true course and true ground speed by the addition of the circuit shown in FIG. 6.

A voltage proportional to $W_E$, the rotational velocity of the earth, is the output of a voltage divider 175 which is energized by $\phi_1$. The $W_E$ voltage energizes the primary winding 176 of a resolver 177 the secondary winding 178 of which is driven according to $\lambda$ by shaft 117 so that the output of secondary winding 178 is proportional to $W_E \cos \lambda$.

Rotor winding 178 is connected in series with secondary winding 113 of resolver 111 and primary winding 179 of resolver 180 so that the voltage energizing primary winding 179 is proportional to the algebraic difference of the outputs of rotor windings 113 and 178 or $$\frac{dL}{dt} \cos \lambda - W_E \cos \lambda = \left(\frac{dL}{dt} - W_E\right) \cos \lambda$$

which is the same as $$\frac{dL'}{dt} \cos \lambda$$

the rate of easterly travel of the craft. The other primary winding 181 of resolver 180 is connected to the output of secondary winding 114 so that the voltage energizing primary winding 181 is proportional to $d\lambda/dt$ or the rate of northerly travel of the craft.

With these northerly and easterly components of speed, the resolver 180 solves for the speed and course of the craft in the usual manner. Thus, motor 182 is energized by the output of one secondary or rotor winding 183 so that motor 182 drives the rotor winding 183 to the noninductive or null position where the displacement of the shaft 184 of motor 182 is proportional to $$\text{arc tan} \frac{\frac{dL'}{dt}}{\frac{d\lambda}{dt}} \cos \lambda$$

or the course C of the craft. Shaft 184 also drives dial 185 to display the course C opposite a fixed index 186.

Also the output of the secondary winding 187 is proportional to the vector sum of the northerly and easterly components of speed $$\sqrt{\left(\frac{dL'}{dt} \cos \lambda\right)^2 + \left(\frac{d\lambda}{dt}\right)^2}$$

or the true ground speed S of the craft. The speed, S, can be read on the scale of a voltmeter 188 connected to the rotor winding 187.

An additional indication which can be determined with the present apparatus is that of "heading" as differentiated from "course." The "heading" is defined by the direction in which the longitudinal axis of the craft lies, while the "course" is the direction in which the craft is actually moving. The "heading" is that angle which is usually read on a compass, and since the present instrument can give the heading without recourse to a compass, the compass can be eliminated.

Figure 7:
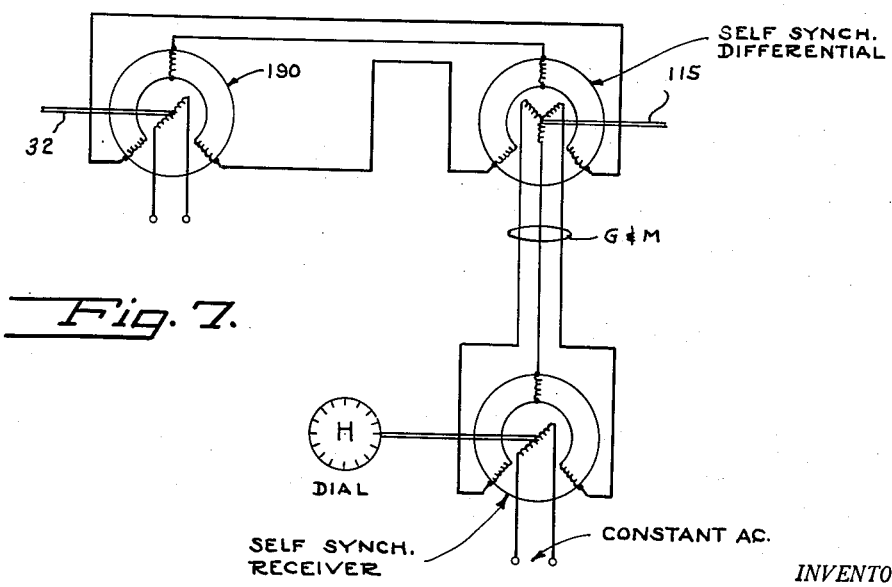
FIGURE 7 illustrates the heading computer.

It will be seen that the heading, H, the angle between the meridian and the longitudinal axis of the craft, is the sum of the angle, $\theta$, between the meridian and the frame 19 and the angle, M, between the frame 19 and the longitudinal axis of the craft. The angle $\theta$ is given by the displacement of shaft 115 while the angle M is the displacement of shaft 32. The sum of the angle $\theta+M$ may be found by use of self synchronous transmitting and receiving equipment connected in the usual manner. Thus, referring to FIGS. 7 and 2, shaft 32 displaces the rotor of a self synchronous generator 190 (FIG. 2), the stator windings of which have induced therein positional signals which are applied to the stator windings of a self synchronous differential generator the rotor windings of which are driven by shaft 115. The output of the differential rotor windings is then representative of $\theta+M=H$ and may be used to drive the dial of a self synchronous receiver from which the heading may be read.

I claim:

1. In a device of the character described, a support, a pair of accelerometers adapted to be responsive to horizontal accelerations of said support, means for maintaining said accelerometers irrotational with respect to inertial space about an axis perpendicular to the plane of the accelerometer axes, integrating means connected to said accelerometers for obtaining velocity values from said accelerometers, position computer means connected to the outputs of said integrating means and adapted to accept said velocity values and to transform said velocity values into components irrotational with respect to earth and computing positional coordinates on earth and second computer means connected to said position computer means and adapted to calculate the speed and direction of motion of said support from values developed in said positional computer.

2. In a device of the character described, a support, a pair of orthogonally disposed accelerometers on said support and means for maintaining said accelerometers irrotational with respect to inertial space about an axis perpendicular to the plane of the accelerometer axes, integrating means connected to said accelerometers for obtaining velocity values from said accelerometers, position computer means connected to the outputs of said integrating means and adapted to accept said velocity values and to transform said velocity values into components irrotational with respect to earth and computing positional coordinates on earth and second computer means connected to said position computer means and adapted to calculate the speed and direction of motion of the support from values developed in the positional computer.

3. In a device of the character described, a support, a pair of accelerometers adapted to be responsive to horizontal accelerations of said support, gyroscopic means for maintaining said accelerometers irrotational with respect to inertial space about an axis perpendicular to the plane of the accelerometer axes, integrating means connected to said accelerometers for obtaining velocity values from said accelerometers, position computer means connected to the outputs of said integrating means and adapted to accept said velocity values and to transform said velocity values into components irrotational with respect to earth and computing positional coordinates on earth and second computer means connected to said position computer means and adapted to calculate the speed and direction of motion of the support from values developed in the positional computer.

4. In a device of the character described, a support, a pair of accelerometers adapted to be responsive to horizontal accelerations of said support, means for maintaining said accelerometers irrotational with respect to inertial space about an axis perpendicular to the plane of the accelerometer axes, integrating means for obtaining velocity values from said accelerometers, position computer means connected to the outputs of said integrating means and adapted to accept said velocity values and to transform said velocity values into components irrotational with respect to earth and computing positional coordinates on earth and second computer means connected to said position computer means and adapted to calculate the speed and direction of motion of the support from values developed in the positional computer.

5. In a device of the character described, a support, a pair of accelerometers adapted to be responsive to horizontal accelerations of said support, gyroscopic means for maintaining said accelerometers irrotational with respect to inertial space about an axis perpendicular to the plane of the accelerometer axes, integrating means for obtaining velocity values from said accelerometers, position computer means connected to the outputs of said integrating means and adapted to accept said velocity values and to transform said velocity values into components irrotational with respect to earth and computing positional coordinates on earth and second computer means connected to said position computer means and adapted to calculate the speed and direction of motion of the support from values developed in the positional computer.

6. In a device of the character described, a support, a pair of orthogonally disposed accelerometers on said support and gyroscopic means for maintaining said accelerometers irrotational with respect to inertial space about an axis perpendicular to the plane of the accelerometer axes, integrating means for obtaining velocity values from said accelerometers, position computer means connected to the outputs of said integrating means and adapted to accept said velocity values and to transform said velocity values into components irrotational with respect to earth and computing positional coordinates on earth and second computer means connected to said position computer means and adapted to calculate the speed and direction of motion of the support from values developed in the positional computer.

7. In a device of the character described, a support, a pair of orthogonally disposed accelerometers on said support and means for maintaining said accelerometers irrotational with respect to inertial space about an axis perpendicular to the plane of the accelerometer axes, integrating means for obtaining velocity values from said accelerometers, position computer means connected to the outputs of said integrating means and adapted to accept said velocity values and to transform said velocity values into components irrotational with respect to earth and computing positional coordinates on earth and second computer means connected to said position computer means and adapted to calculate the speed and direction of motion of said support from values developed in the positional computer.

References Cited in the file of this patent

UNITED STATES PATENTS

| | | |
|---|---|---|
| 2,109,283 | Boykow | Feb. 22, 1938 |
| 2,208,207 | Boykow | July 16, 1940 |
| 2,371,626 | Kecskemeti | Mar. 20, 1945 |
| 2,591,697 | Hays | Apr. 8, 1952 |
| 2,613,071 | Hansel | Oct. 7, 1952 |
| 2,631,455 | Wing | Mar. 17, 1953 |
| 2,638,288 | Hanna | May 12, 1953 |
| 2,734,278 | Hammond | Feb. 14, 1956 |
| 2,752,792 | Draper | July 3, 1956 |